(12) United States Patent
Matsuo et al.

(10) Patent No.: US 8,850,110 B2
(45) Date of Patent: Sep. 30, 2014

(54) VIRTUAL TAPE DEVICE AND TAPE MOUNT CONTROL METHOD

(71) Applicant: Fujitsu Limited, Kawasaki (JP)

(72) Inventors: Fumio Matsuo, Nagano (JP); Katsuo Enohara, Kawaguchi (JP); Takaaki Yamato, Nagano (JP); Nobuyuki Hirashima, Nagano (JP); Takashi Murayama, Nagano (JP)

(73) Assignee: Fujitsu Limited, Kawasaki (JP)

( * ) Notice: Subject to any disclaimer, the term of this patent is extended or adjusted under 35 U.S.C. 154(b) by 159 days.

(21) Appl. No.: 13/677,488

(22) Filed: Nov. 15, 2012

(65) Prior Publication Data

US 2013/0205081 A1    Aug. 8, 2013

(30) Foreign Application Priority Data

Feb. 2, 2012 (JP) ................... 2012-021286

(51) Int. Cl.
*G06F 12/00* (2006.01)
(52) U.S. Cl.
USPC ................ 711/111; 711/4; 711/170; 711/203
(58) Field of Classification Search
None
See application file for complete search history.

(56) References Cited

U.S. PATENT DOCUMENTS

2011/0145494 A1*  6/2011  Mitsuma et al. ............... 711/111

FOREIGN PATENT DOCUMENTS

| JP | 2002-170295 | 6/2002 |
| JP | 2011-123834 | 6/2011 |

* cited by examiner

*Primary Examiner* — Shawn X Gu
(74) *Attorney, Agent, or Firm* — Staas & Halsey LLP

(57) ABSTRACT

A virtual tape device includes a storage unit, an instruction unit, and a reading unit. The storage unit stores a plurality of logical volumes. The instruction unit receives a request for mounting a specified logical volume from an information processing apparatus. The instruction unit issues a mount instruction to both a physical tape device communicated to the virtual tape device and a virtual device communicated to the virtual tape device when the specified logical volume is not stored in the storage unit. The mount instruction instructs to mount the specified logical volume. The reading unit reads data of the specified logical volume to the storage unit from a device which outputs a mount completion notification first among both of the devices which have received the mount instruction.

6 Claims, 6 Drawing Sheets

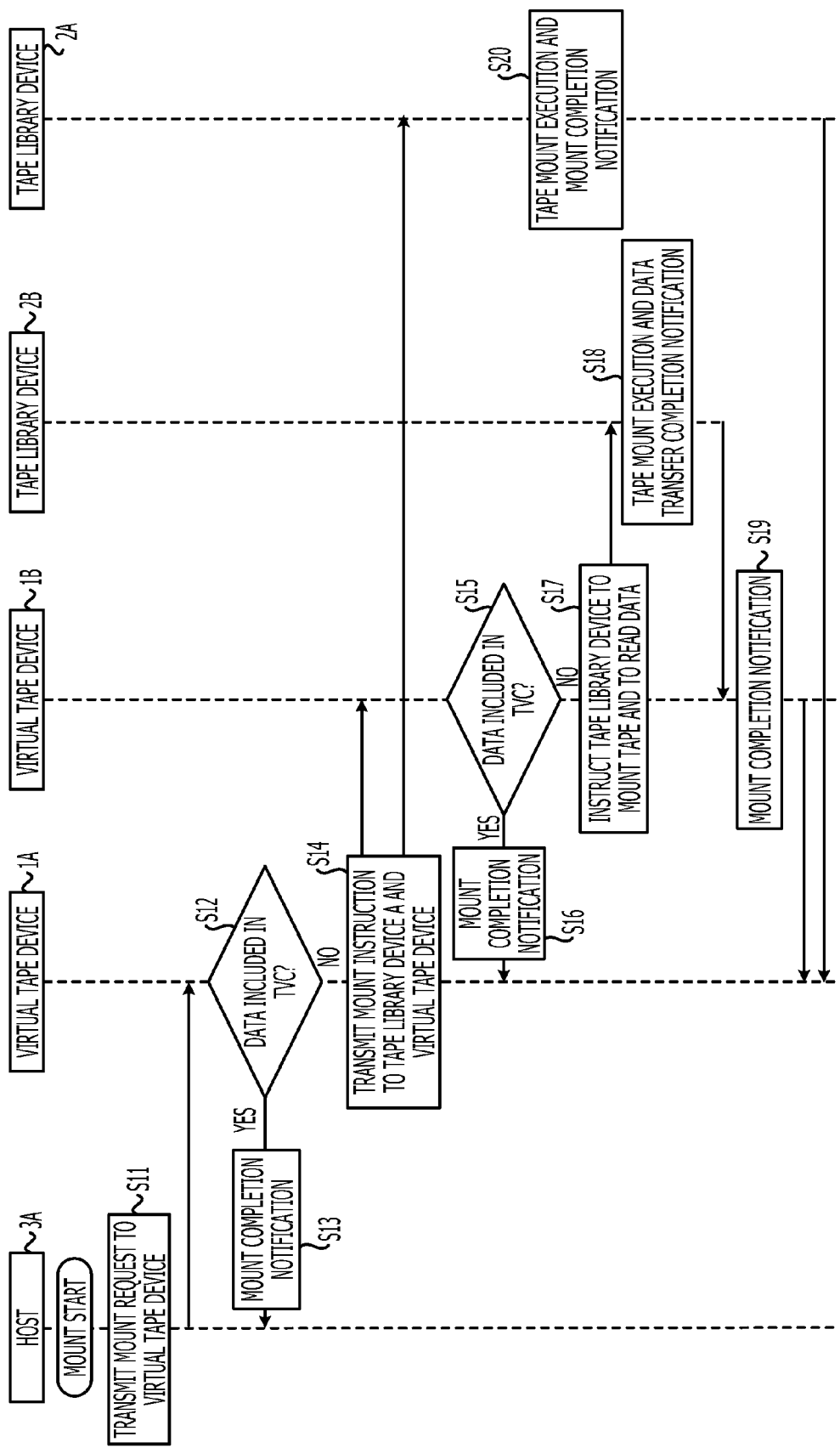

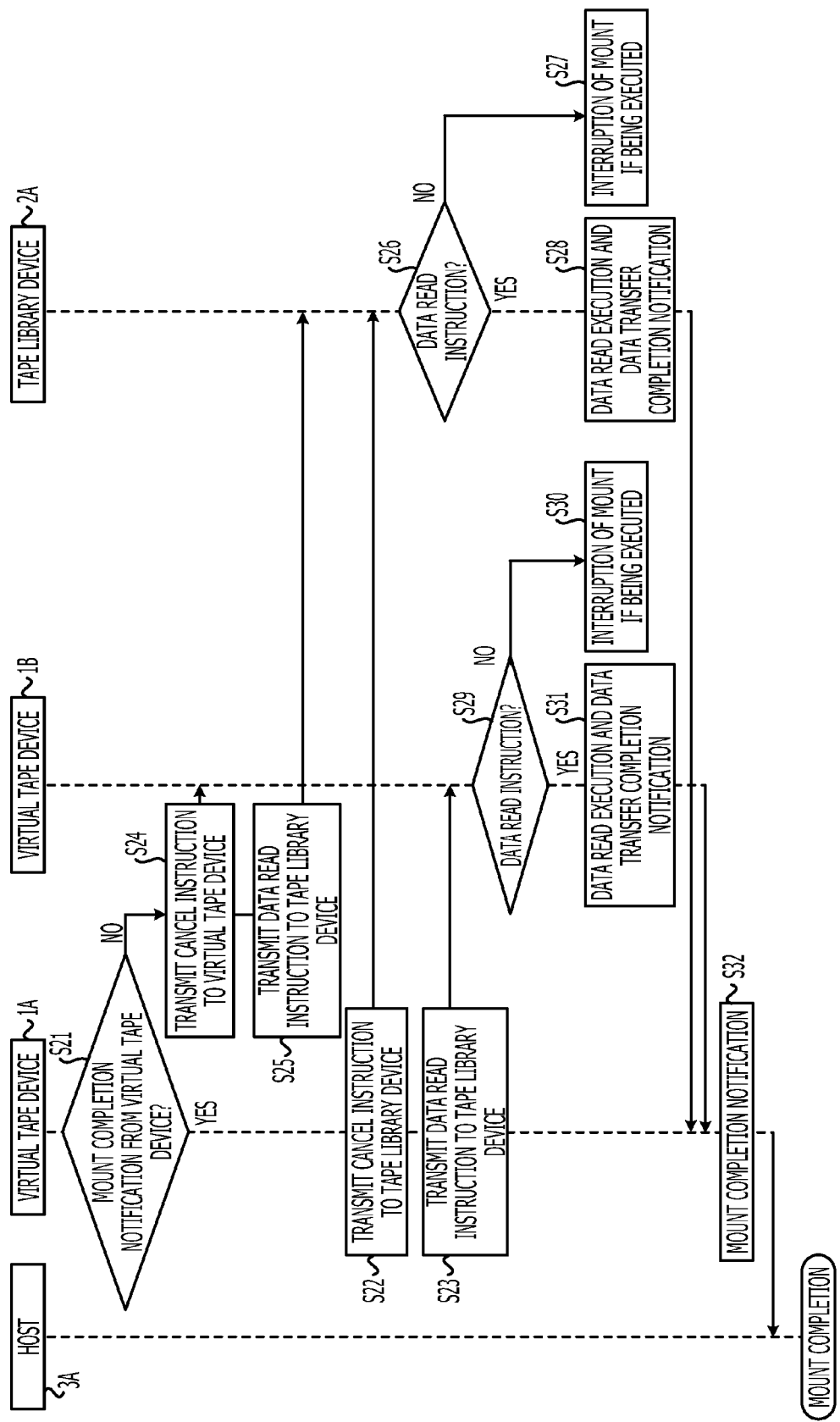

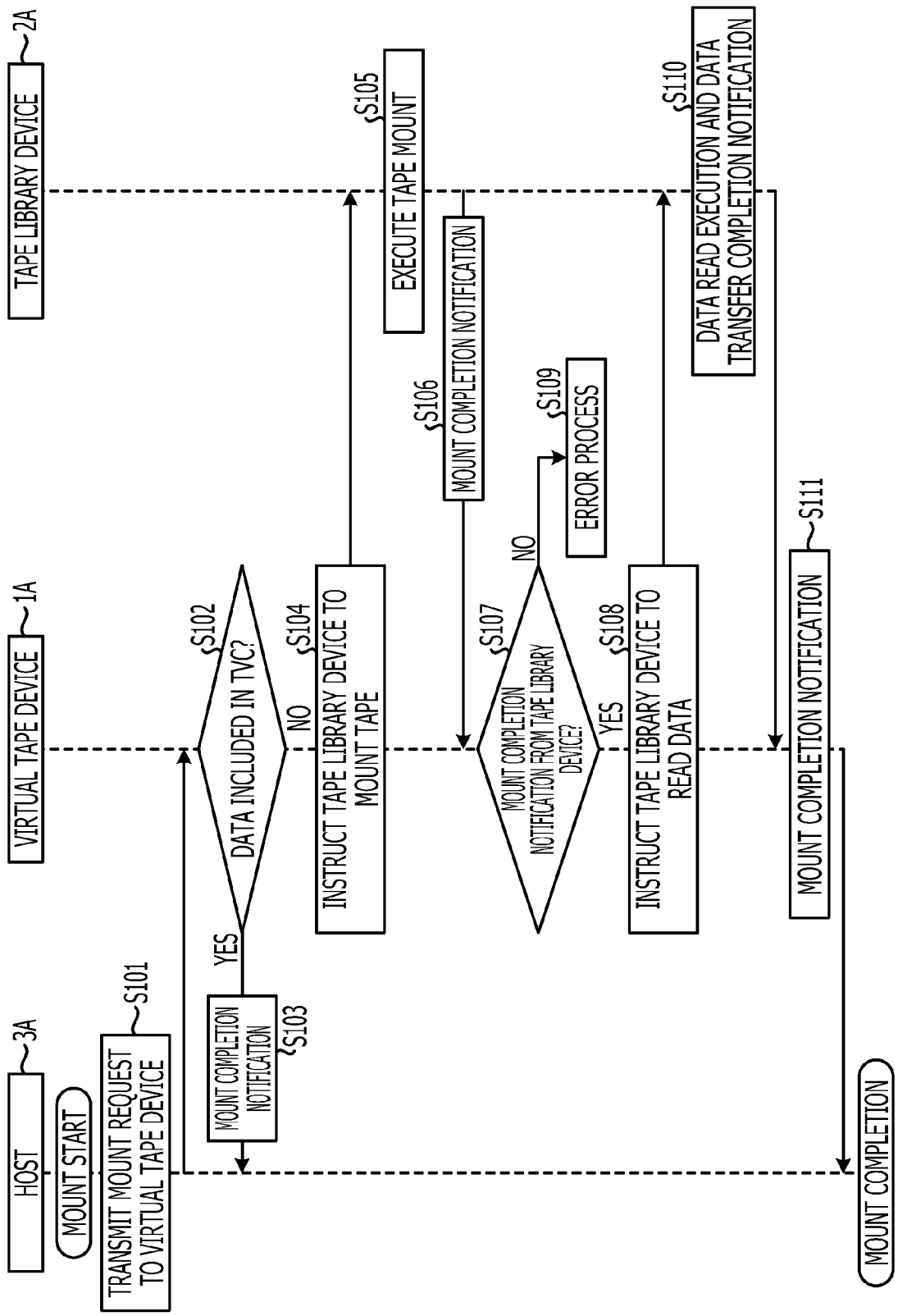

VIRTUAL TAPE DEVICE AND TAPE MOUNT CONTROL METHOD

CROSS-REFERENCE TO RELATED APPLICATION

This application is based upon and claims the benefit of priority of the prior Japanese Patent Application No. 2012-021286, filed on Feb. 2, 2012, the entire contents of which are incorporated herein by reference.

FIELD

The embodiments discussed herein are related to a virtual tape device.

BACKGROUND

In general, a system including a tape device which records data in a physical medium such as a magnetic tape and an RAID (redundant arrays of inexpensive disks) device which virtually stores the data recorded in the tape device has been widely used as a virtual tape system.

A general virtual tape system will be described with reference to FIG. 5, for example. FIG. 5 is a diagram illustrating a configuration of a general virtual tape system. As illustrated in FIG. 5, a virtual tape system 900 includes a virtual tape device 910 and a tape library device 920. The virtual tape system 900 is communicably connected to a host 930.

The virtual tape device 910 includes a TVC (tape volume cache) 911 which stores data of a plurality of logical volumes (LVs). The TVC 911 uses a RAID device, for example, as a cache. The tape library device 920 includes drives 921 to which magnetic tapes 922 are loaded, respectively.

In the virtual tape system 900 configured as described above, a logical volume written from the host 930 is temporarily stored in the TVC 911. Thereafter, the logical volume is written in a physical volume (PV) included in the tape library device 920 when being output to the tape library device 920. This operation is referred to as "migration".

Upon receiving a request for mounting a logical volume from the host 930, the virtual tape device 910 determines whether the logical volume is included in the TVC 911. When it is determined that the TVC 911 does not include the logical volume and the mount request represents a reading request, the virtual tape device 910 reads the logical volume, which is a target of the mount request, from the tape library device 920 to the TVC 911. An operation of reading data of a logical volume included in a magnetic tape of the tape library device 920 to the TVC 911 as described above is referred to as "recall".

Japanese Laid-open Patent Publication No. 2011-123834 and Japanese Laid-open Patent Publication No. 2002-170295 disclose related techniques.

In the general virtual tape system, however, there arises a problem in that data of a logical volume may not be swiftly read at a time of recall.

A virtual tape device unconditionally reads data of a logical volume from a magnetic tape mounted in a tape library device at the time of recall and a long period of time is used for an operation of mounting the magnetic tape on a drive and an operation for positioning in the drive. Thus, if the magnetic tape has not been mounted on the drive, a long period of time is used for the operation of mounting the magnetic tape or the like. Accordingly, the data of the logical volume is not swiftly read.

Note that the problem described above occurs not only in the case of a magnetic tape but also a case of a general tape such as a paper tape.

SUMMARY

According to an aspect of the present invention, provided is a virtual tape device including a storage unit, an instruction unit, and a reading unit. The storage unit stores a plurality of logical volumes. The instruction unit receives a request for mounting a specified logical volume from an information processing apparatus. When the specified logical volume is not stored in the storage unit, the instruction unit issues a mount instruction to both a physical tape device which communicates with the virtual tape device and a virtual device which communicates with the virtual tape device. The mount instruction instructs to mount the specified logical volume. The reading unit reads data of the specified logical volume to the storage unit from a device which outputs a mount completion notification first among both of the devices which have received the mount instruction.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 3A and 3B are diagrams illustrating tape mount control according to an embodiment;

FIG. 4 is a sequence diagram illustrating tape mount control of a virtual tape device.

DESCRIPTION OF EMBODIMENTS

Hereinafter, embodiments of a virtual tape device and a tape mount control method will be described in detail with reference to the accompanying drawings. Note that the technique is not limited to the embodiments.

Embodiment

Configuration of Virtual Tape System

Figure 1:
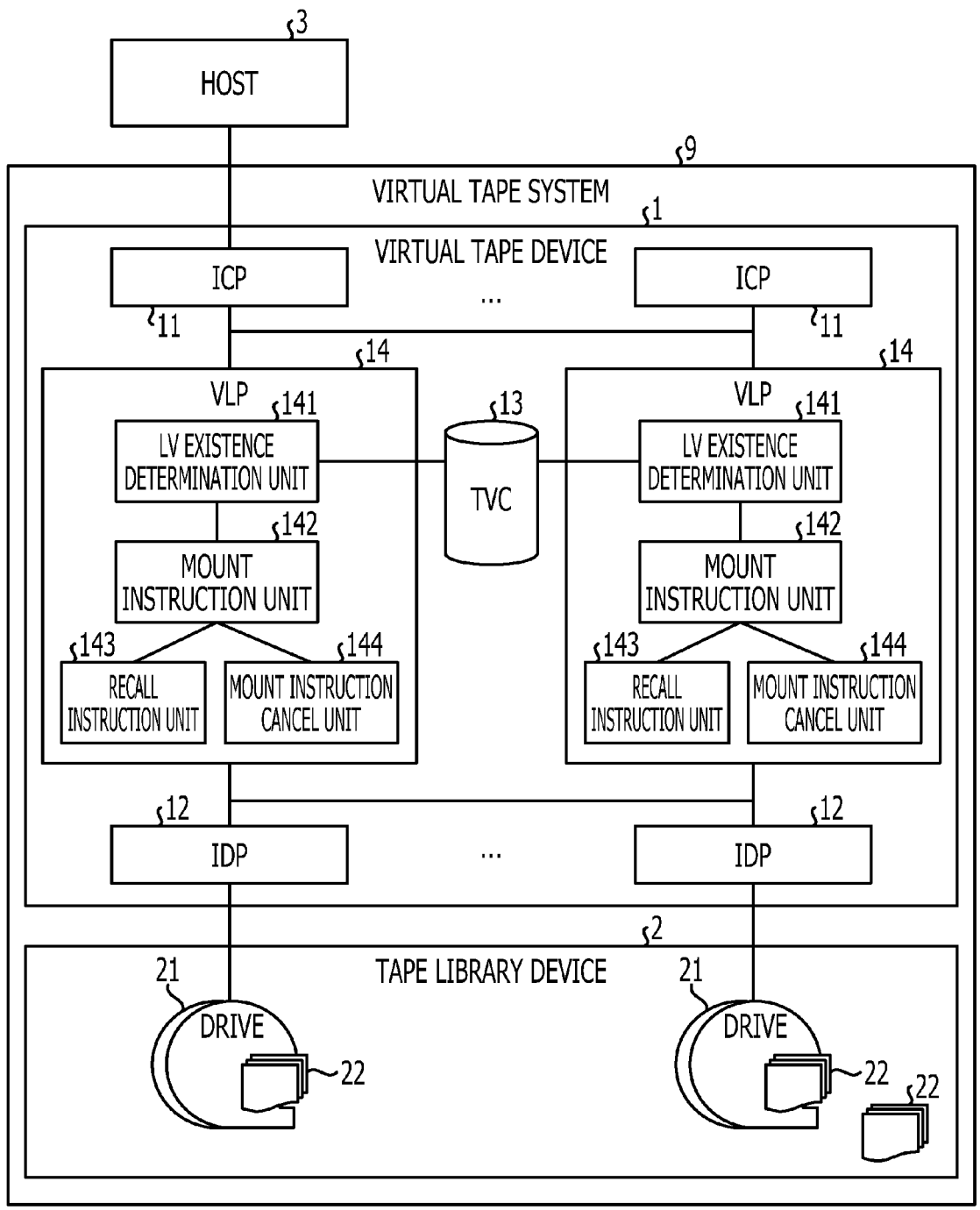
FIG. 1 is a diagram illustrating a functional configuration of a virtual tape system according to an embodiment.

FIG. 1 is a diagram illustrating a functional configuration of a virtual tape system according to an embodiment. As illustrated in FIG. 1, a virtual tape system 9 includes a virtual tape device 1 and a tape library device 2. The virtual tape system 9 is communicably connected to a host 3. It is assumed that the virtual tape system 9 is connected in a cascade manner to another virtual tape system which manages data as equivalent of data of the virtual tape system 9.

The tape library device 2 includes tape drives 21 serving as tape cartridges and magnetic tapes 22. Note that the number of tape drives 21 and the number of magnetic tapes 22 are not limited to those illustrated in FIG. 1 and may be appropriately changed.

The virtual tape device 1 virtualizes the magnetic tapes 22. The virtual tape device 1 includes a plurality of ICPs (Integrated Channel Processors) 11, a plurality of IDPs (Integrated Device Processors) 12, a TVC 13, and a duplex VLP (Virtual Library Processor) 14. The ICP 11 controls an interface to the host 3. The IDP 12 controls an interface to the tape library device 2. The TVC 13 is a cache assigned as a virtual tape volume instead of the magnetic tapes 22 and stores a plurality of logical volumes. The TVC 13 uses a RAID device as the cache, for example.

The VLP 14 manages the TVC 13 and controls the entire virtual tape device 1. The VLP 14 includes LV existence determination units 141, mount instruction units 142, recall instruction units 143, and mount instruction cancel units 144.

Upon receiving a request for mounting a logical volume from the host 3 through one of the ICPs 11, the LV existence determination unit 141 determines whether the specified logical volume is included in the TVC 13. The request for mounting a logical volume requests realization of a state in which the specified logical volume is stored in the TVC 13 included in the virtual tape device 1. When the LV existence determination unit 141 determines that the specified logical volume is included in the TVC 13, mounting of a physical volume is not required. Therefore, the LV existence determination unit 141 notifies the host 3 through one of the ICPs 11 of a fact that the mounting of the logical volume is completed. On the other hand, upon determining that the specified logical volume is not included in the TVC 13, the LV existence determination unit 141 causes the mount instruction unit 142 to issue an instruction for mounting the specified logical volume, which will be described later.

When it is determined that the specified logical volume is not included in the TVC 13, the mount instruction unit 142 instructs the tape library device 2 connected to the virtual tape device 1 and the other virtual tape device connected to the virtual tape device 1 in a cascade manner to mount the specified logical volume. The instruction for mounting a logical volume represents realization of a state in which the recall of the specified logical volume to the TVC 13 included in the virtual tape device 1 is available. That is, data of the specified logical volume may be read from the tape library device 2 connected to the virtual tape device 1 or may be obtained from a TVC of the other virtual tape device. An operation of obtaining data of a logical volume included in a TVC of another virtual tape device is also referred to as "recall" in this description. Specifically, the mount instruction unit 142 instructs the tape library device 2 connected to the virtual tape device 1 to mount a magnetic tape 22 which includes the specified logical volume to cause the tape library device 2 to mount the magnetic tape 22 on one of the tape drives 21 so that the specified logical volume is available for the recall process. On the other hand, the mount instruction unit 142 causes the other virtual tape device connected to the virtual tape device 1 in a cascade manner to keep the specified logical volume in a TVC of the other virtual tape device so that the specified logical volume is available for the recall process.

The recall instruction unit 143 reads data of the specified logical volume to the TVC 13 of the virtual tape device 1 from a device which transmits a mount completion notification first, among the devices which have received the instruction for mounting the logical volume. Specifically, the recall instruction unit 143 prompts the device which becomes available for the recall process first among the devices which have received the mount instruction to perform the recall process. When the reading of the specified logical volume is completed, the recall instruction unit 143 notifies the host 3 through one of the ICPs 11 of the completion of the mounting of the logical volume.

The mount instruction cancel unit 144 cancels the mount instruction issued to a device which outputs a mount completion notification later among the devices which have received the instruction for mounting the logical volume.

A process of mounting a logical volume performed when the virtual tape system 9 is not connected to another virtual tape system in a cascade manner will be described. When the LV existence determination unit 141 determines that the specified logical volume is not included in the TVC 13, the VLP 14 performs the following process. The VLP 14 instructs the tape library device 2 to mount a magnetic tape 22 which includes the specified logical volume and causes the tape library device 2 to mount the magnetic tape 22 on one of the tape drives 21. Thereafter, the VLP 14 reads the data of the specified logical volume to the TVC 13 included in the virtual tape device 1 from the tape library device 2. That is, the VLP 14 prompts the tape library device 2 to perform the recall process. When the reading of the specified logical volume is completed, the VLP 14 notifies the host 3 through one of the ICPs 11 of the completion of the mounting of the logical volume.

Concrete Example of Tape Mount Control

Figure 2:
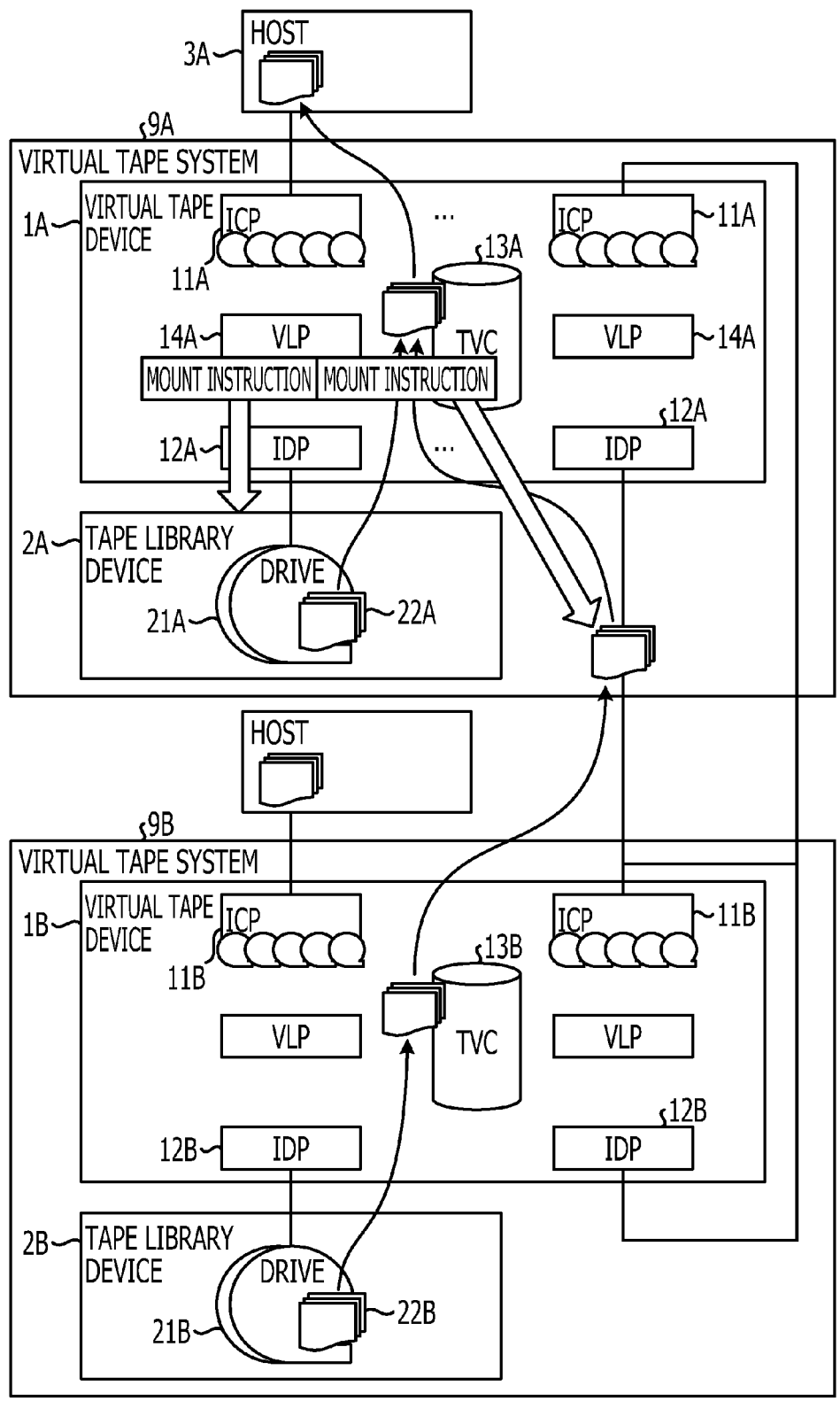
FIG. 2 is a diagram illustrating tape mount control according to an embodiment.
Figure 5:
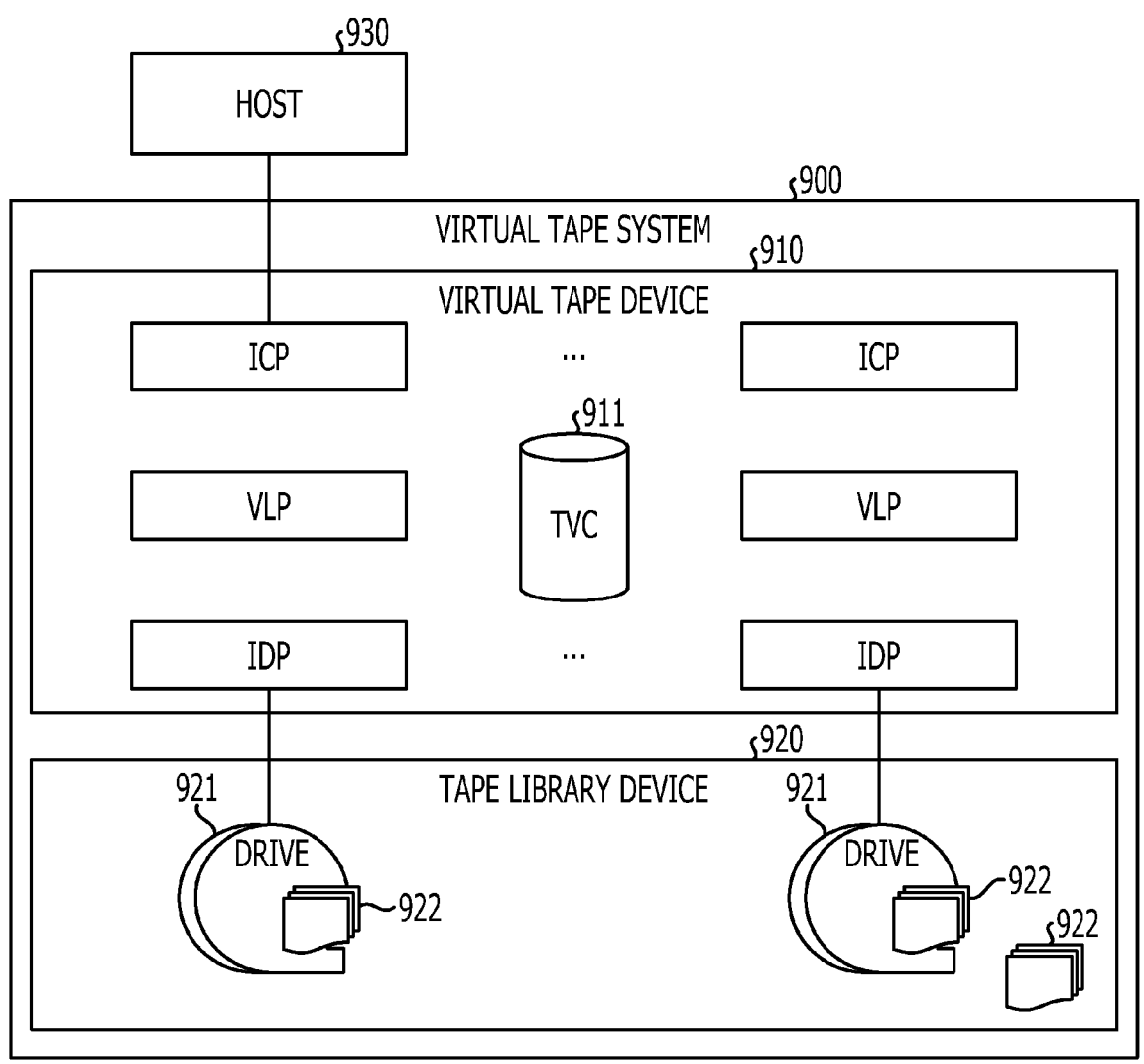
FIG. 5 is a diagram illustrating a configuration of a virtual tape system in a related art.

A concrete example of the tape mount control of this embodiment will be described with reference to FIG. 2. FIG. 2 is a diagram illustrating tape mount control according to an embodiment. As illustrated in FIG. 2, a virtual tape system 9A is connected to a virtual tape system 9B in a cascade manner. In a cascade connection in the example of FIG. 2, one of ICPs 11A included in a virtual tape device 1A and one of IDPs 12B included in a virtual tape device 1B are connected to each other by a cable. Furthermore, the cascade connection is realized by connecting one of IDPs 12A included in the virtual tape device 1A and one of ICPs 11B included in the virtual tape device 1B to each other by a cable. A physical volume of a tape library device 2A is equivalent to a physical volume of a tape library device 2B.

With this system configuration, when the virtual tape device 1A receives a request for mounting a logical volume from a host 3A, an LV existence determination unit 141 in one of VLPs 14A determines whether the specified logical volume is included in a TVC 13A. Thereafter, when the LV existence determination unit 141 determines that the specified logical volume is not included in the TVC 13A, a mount instruction unit 142 in the one of VLPs 14A instructs both of the tape library device 2A connected to the virtual tape device 1A and the virtual tape device 1B connected to the virtual tape device 1A in a cascade manner to mount the specified logical volume.

A recall instruction unit 143 in the one of VLPs 14A reads data of the specified logical volume from a device which outputs a mount completion notification first, among the devices which have received the instruction for mounting the logical volume, to the TVC 13A of the virtual tape device 1A. Here, when the tape library device 2A connected to the virtual tape device 1A transmits the mount completion notification first, the recall instruction unit 143 reads the data of the specified logical volume from one of magnetic tapes 22A to the TVC 13A of the virtual tape device 1A. In this case, a mount instruction cancel unit 144 in the one of VLPs 14A cancels the mount instruction issued to the virtual tape device 1B which outputs a mount completion notification after the tape library device 2A.

On the other hand, when the virtual tape device 1B connected to the virtual tape device 1A in a cascade manner transmits the mount completion notification first, the recall instruction unit 143 reads the data of the specified logical volume from a TVC 13B of the virtual tape device 1B to the TVC 13A of the virtual tape device 1A. In this case, the mount instruction cancel unit 144 cancels the mount instruction issued to the tape library device 2A which lags behind the virtual tape device 1B in outputting the mount completion notification.

Sequence of Tape Mount Control

A sequence of tape mount control of this embodiment will be described with reference to FIGS. 3A and 3B. FIGS. 3A and 3B are diagrams illustrating tape mount control according to an embodiment.

First, the host 3A transmits a request for mounting a specific logical volume to the virtual tape device 1A (S11).

The virtual tape device 1A which has received the mount request determines whether data of the specified logical volume is included in the TVC 13A (S12). When the data of the specified logical volume is included in the TVC 13A (S12; Yes), the virtual tape device 1A notifies the host 3A of completion of the mounting of the specified logical volume (S13). On the other hand, when the data of the specified logical volume is not included in the TVC 13A (S12; No), the virtual tape device 1A instructs the tape library device 2A and the virtual tape device 1B connected to the virtual tape device 1A in a cascade manner to mount the logical volume (S14).

The virtual tape device 1B which has received the instruction for mounting the logical volume determines whether the data of the specified logical volume is included in the TVC 13B of the virtual tape device 1B (S15). When the data of the specified logical volume is included in the TVC 13B of the virtual tape device 1B (S15; Yes), the virtual tape device 1B notifies the virtual tape device 1A of completion of the mounting of the specified logical volume (S16). On the other hand, when the data of the specified logical volume is not included in the TVC 13B of the virtual tape device 1B (S15; No), the virtual tape device 1B instructs the tape library device 2B to mount a tape which includes the logical volume. Thereafter, the virtual tape device 1B instructs the tape library device 2B to read the data of the specified logical volume (S17).

The tape library device 2B which has received the tape mount instruction executes mounting of one of magnetic tapes 22B which includes the specified logical volume. Specifically, the tape library device 2B mounts one of the magnetic tapes 22B which includes the specified logical volume on one of tape drives 21B so that a recall process is performed. Thereafter, the tape library device 2B which has received the instruction for reading the data of the logical volume reads the data of the logical volume from mounted one of the magnetic tapes 22B to the TVC 13B. Specifically, the tape library device 2B transfers the data of the logical volume included in mounted one of the magnetic tapes 22B to the TVC 13B and performs the recall process. After the data transfer is completed, the tape library device 2B notifies the virtual tape device 1B of the completion of the data transfer (S18).

The virtual tape device 1B which has received the data transfer completion notification notifies the virtual tape device 1A of completion of the mounting of the specified logical volume (S19).

On the other hand, the tape library device 2A which has received the instruction for mounting the logical volume executes mounting of one of the magnetic tapes 22A which includes the specified logical volume. Specifically, the tape library device 2A mounts one of the magnetic tapes 22A which includes the specified logical volume on one of tape drives 21A so that the recall process is performed. After the mounting of the magnetic tape 22A is completed, the tape library device 2A notifies the virtual tape device 1A of the completion of the mounting of the magnetic tape 22A (S20).

Thereafter, the virtual tape device 1A which has received the completion notification from the virtual tape device 1B or the tape library device 2A determines whether the received completion notification is the mount completion notification supplied from the virtual tape device 1B (S21). When the received completion notification is the mount completion notification supplied from the virtual tape device 1B (S21; Yes), the virtual tape device 1A cancels the mount instruction issued in S14 to the tape library device 2A which lags behind the virtual tape device 1B in outputting the completion notification (S22). Thereafter, the virtual tape device 1A instructs the virtual tape device 1B which precedes the tape library device 2A in outputting the completion notification to read the logical volume specified by the mount request (S23). That is, the virtual tape device 1A prompts the virtual tape device 1B, which becomes available for the recall process first, to perform the recall process.

On the other hand, when the received completion notification is not the mount completion notification supplied from the virtual tape device 1B (S21; No), the virtual tape device 1A cancels the mount instruction issued in S14 to the virtual tape device 1B which lags behind the tape library device 2A in outputting the completion notification (S24). Thereafter, the virtual tape device 1A instructs the tape library device 2A which precedes the virtual tape device 1B in outputting the completion notification to read the logical volume specified by the mount request (S25). That is, the virtual tape device 1A prompts the tape library device 2A, which becomes available for the recall process first, to perform the recall process.

The tape library device 2A which has received the cancel instruction or the data read instruction from the virtual tape device 1A determines whether the data read instruction has been received (S26). When the data read instruction has been received (S26; Yes), the tape library device 2A reads the data of the logical volume specified by the mount request from one of the magnetic tapes 22A to the TVC 13A. Specifically, the tape library device 2A transfers the data of the logical volume included in one of the magnetic tapes 22A to the TVC 13A to perform the recall process. After the data transfer is completed, the tape library device 2A notifies the virtual tape device 1A of the completion of the data transfer (S28). On the other hand, when the data read instruction has not been received (S26; No), that is, the cancel instruction has been received, the tape library device 2A interrupts tape mount if the tape mount is being executed (S27). By this, the tape library device 2A suppresses wasteful use of the tape drives 21A.

The virtual tape device 1B which has received the cancel instruction or the data read instruction from the virtual tape device 1A determines whether the data read instruction has been received (S29). When the data read instruction has been received (S29; Yes), the virtual tape device 1B reads the data of the logical volume specified by the mount request from the TVC 13B of the virtual tape device 1B to the TVC 13A. Specifically, the virtual tape device 1B transfers the data of the logical volume included in the TVC 13B to the TVC 13A to perform the recall process. After the data transfer is completed, the virtual tape device 1B notifies the virtual tape device 1A of the completion of the data transfer (S31). On the other hand, when the data read instruction has not been received (S29; No), that is, the cancel instruction has been received, the virtual tape device 1B interrupts tape mount if the tape mount is being executed in the tape library device 2B (S30). By this, the virtual tape device 1B suppresses unavailing use of the tape drives 21B.

The virtual tape device 1A which has received the data transfer completion notification from the tape library device 2A or the virtual tape device 1B notifies the host 3A of completion of the mounting of the specified logical volume (S32). Then the virtual tape device 1A terminates the tape mount control.

Here, a sequence of tape mount control in a case where the virtual tape system 9A illustrated in FIG. 2 is not connected to the other virtual tape system 9B in a cascade manner will be described with reference to FIG. 4. FIG. 4 is a sequence diagram illustrating tape mount control performed by the virtual tape device 1A.

First, the host 3A transmits a request for mounting a specific logical volume to the virtual tape device 1A (S101).

The virtual tape device 1A which has received the mount request determines whether data of the specified logical volume is included in the TVC 13A (S102). When the data of the specified logical volume is included in the TVC 13A (S102; Yes), the virtual tape device 1A notifies the host 3A of completion of the mounting of the specified logical volume (S103). On the other hand, when the data of the specified logical volume is not included in the TVC 13A (S102; No), the virtual tape device 1A instructs the tape library device 2A to mount a tape (S104).

The tape library device 2A which has received the tape mount instruction executes mounting of one of the magnetic tapes 22A which includes the specified logical volume (S105). Specifically, the tape library device 2A loads one of the magnetic tapes 22A which includes the specified logical volume in one of the tape drives 21A so that the recall process is performed. After the mounting of one of the magnetic tapes 22A is completed, the tape library device 2A notifies the virtual tape device 1A of the completion of the mounting of the magnetic tape 22A (S106).

Thereafter, the virtual tape device 1A determines whether the mount completion notification has been received from the tape library device 2A (S107). When the mount completion notification has been received from the tape library device 2A (S107; Yes), the virtual tape device 1A instructs the tape library device 2A to read data of the logical volume specified by the mount request (S108). That is, the virtual tape device 1A prompts the tape library device 2A, which becomes available for the recall process, to perform the recall process. On the other hand, when the mount completion notification has not been received from the tape library device 2A (S107; No), the virtual tape device 1A executes an error process (S109). For example, the virtual tape device 1A writes a fact that the mount completion notification has not been received from the tape library device 2A in a log.

The tape library device 2A, which has received the data read instruction from the virtual tape device 1A, reads the data of the logical volume specified by the mount request from one of the magnetic tapes 22A to the TVC 13A. Specifically, the tape library device 2A transfers the data of the logical volume included in one of the magnetic tapes 22A to the TVC 13A to perform the recall process. After the data transfer is completed, the tape library device 2A notifies the virtual tape device 1A of the completion of the data transfer (S110).

The virtual tape device 1A which has received the data transfer completion notification from the tape library device 2A notifies the host 3A of completion of the mounting of the specified logical volume (S111). Then the virtual tape device 1A terminates the tape mount control.

Effects of Embodiment

According to the foregoing embodiment, upon receiving a request for mounting a logical volume from the host 3, the virtual tape device 1 determines whether the logical volume is stored in the TVC 13. When the logical volume is not stored in the TVC 13, the virtual tape device 1 instructs the tape library device 2 and the other virtual tape device connected to the virtual tape device 1 in a cascade manner to mount the logical volume which is a target of the mount request. The virtual tape device 1 reads the data of the logical volume which is the target of the mount request to the TVC 13 from a device which outputs a mount completion notification first among both of the devices which are instructed to mount the logical volume. According to the configuration, the virtual tape device 1 reads the data of the logical volume which is the target of the mount request to the TVC 13 from a device which outputs a mount completion notification first among both of the devices which are instructed to mount the logical volume, that is, the virtual tape device 1 performs the recall process. As a result, the virtual tape device 1 may reduce a period of time used for the mounting since the virtual tape device 1 may promptly read the data of the logical volume in the recall process. Furthermore, even when recalls from a plurality of magnetic tapes 22 are to be simultaneously performed and the number of tape drives 21 is not sufficient, the virtual tape device 1 may reduce a period of time in which succeeding recall processes are completed.

According to the foregoing embodiment, the virtual tape device 1 cancels the mount instruction issued to a device which lags behind another device in outputting the mount completion notification among the devices which have received the mount instruction. With this configuration, the virtual tape device 1 may suppress wasteful spending of resources in the mount process performed by the device which lags behind another device in outputting the mount completion notification. For example, the virtual tape device 1 may suppress wasteful use of one of the tape drives 21 which associates with the device which lags behind another device in outputting the mount completion notification.

Other Embodiments

Note that when the specified logical volume is not included in the TVC 13, the mount instruction unit 142 instructs both of the tape library device 2 connected to the virtual tape device 1 and the other virtual tape device connected to the virtual tape device 1 in a cascade manner to mount the specified logical volume. Here, in the concrete example illustrated in FIG. 2, only one virtual tape device connected to the virtual tape device 1 in a cascade manner is illustrated as the other virtual tape device. However, the number of the other virtual tape devices connected to the virtual tape device 1 in a cascade manner is not limited to this. Two or three other virtual tape devices may be employed, that is, a plurality of other virtual tape devices may be connected to the virtual tape device 1 in a cascade manner. By this, the virtual tape device 1 may further promptly read the data of the logical volume in the recall process since the number of devices which receive a mount instruction is increased. Accordingly, the virtual tape device 1 may reduce a period of time used for the mounting.

It is not necessarily the case that the components included in the virtual tape system 9 are physically configured as illustrated in FIG. 1. For example, although the VLP 14 included in the virtual tape device 1 is duplex in the description, the VLP 14 may be triplex or more.

Specific aspects of separation and integration of the virtual tape system 9 are not limited to those illustrated in FIG. 1 and all or some of the specific aspects may be functionally or physically configured in a distributed or integrated manner in an arbitrary unit depending on various loads or usage conditions. For example, the recall instruction unit 143 and the mount instruction cancel unit 144 may be integrated as a single unit. Furthermore, the TVC 13 may be connected through a network as an external device of the virtual tape device 1.

Furthermore, all or arbitrary some of the processing functions performed by the VLP 14 of the virtual tape device 1 may be realized by a central processing unit (CPU) or a micro computer such as a micro processing unit (MPU) and a micro controller unit (MCU) by executing programs or performed by hardware configured by a wired logic.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A virtual tape device, comprising:
  a storage unit to store a plurality of logical volumes;
  an instruction unit to
    receive a request for mounting a specified logical volume from an information processing apparatus, and
    issue, when the specified logical volume is not stored in the storage unit, a mount instruction to both a physical tape device which communicates with the virtual tape device and a virtual device which communicates with the virtual tape device, the mount instruction instructing to mount the specified logical volume; and
  a reading unit to
    read data of the specified logical volume to the storage unit from a device which outputs a mount completion notification first among both of the devices which have been issued the mount instruction.

2. The virtual tape device according to claim 1, further comprising:
  a cancel unit to
    cancel the mount instruction issued to a device which lags behind another device in outputting the mount completion notification among both of the devices which have been issued the mount instruction.

3. A tape mount control method, comprising:
  receiving, by a virtual tape device, a request for mounting a specified logical volume from an information processing apparatus;
  issuing, when the specified logical volume is not stored in a storage unit, a mount instruction to both a physical tape device which communicates with the virtual tape device and a virtual device which communicates with the virtual tape device, the mount instruction instructing to mount the specified logical volume; and
  reading data of the specified logical volume to the storage unit from a device which outputs a mount completion notification first among both of the devices which have been issued the mount instruction.

4. The tape mount control method according to claim 3, further comprising:
  cancelling the mount instruction issued to a device which lags behind another device in outputting the mount completion notification among both of the devices which have been issued the mount instruction.

5. A virtual tape system, comprising:
  a physical tape device; and
  a virtual tape device which communicates with the physical tape device, the virtual tape device including:
    a storage unit to store a plurality of logical volumes,
    an instruction unit to
      receive a request for mounting a specified logical volume from an information processing apparatus, and
      issue, when the specified logical volume is not stored in the storage unit, a mount instruction to both of the physical tape device and a virtual device which communicates with the virtual tape device, the mount instruction instructing to mount the specified logical volume, and
    a reading unit to
      read data of the specified logical volume to the storage unit from a device which outputs a mount completion notification first among both of the devices which have been issued the mount instruction.

6. The virtual tape system according to claim 5, wherein the virtual tape device further includes:
  a cancel unit to
    cancel the mount instruction issued to a device which lags behind another device in outputting the mount completion notification among both of the devices which have been issued the mount instruction.

* * * * *